United States Patent
Lee et al.

(10) Patent No.: US 8,305,030 B2
(45) Date of Patent: Nov. 6, 2012

(54) CLASSIFIED SOLAR CHARGING METHOD

(75) Inventors: Hsiao-Yi Lee, Zhubei (TW); Yu-Nan Liu, Kaohsiung (TW); Yu-Jen Liu, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 261 days.

(21) Appl. No.: 12/815,648

(22) Filed: Jun. 15, 2010

(65) Prior Publication Data
US 2011/0133685 A1 Jun. 9, 2011

(30) Foreign Application Priority Data
Dec. 3, 2009 (TW) ................................ 98141274 A

(51) Int. Cl.
*H01M 10/44* (2006.01)
(52) U.S. Cl. ....................................................... 320/101
(58) Field of Classification Search .................. 320/101
See application file for complete search history.

(56) References Cited

U.S. PATENT DOCUMENTS

| | | | | |
|---|---|---|---|---|
| 6,127,797 A | * | 10/2000 | Walker | 320/101 |
| 6,765,363 B2 | * | 7/2004 | LaFollette et al. | 320/107 |
| 2005/0057215 A1 | * | 3/2005 | Matan | 320/101 |

* cited by examiner

*Primary Examiner* — M'Baye Diao
(74) *Attorney, Agent, or Firm* — Rabin & Berdo, P.C.

(57) ABSTRACT

A classified solar charging method defines four magnitude classes of charging current in accordance with a combination selected from four magnitude classes of power production of a solar cell and four magnitude classes of capacity of each rechargeable battery of a rechargeable battery pack. In addition to the optimal charging current, the method simultaneously takes an operating temperature of the rechargeable battery into account upon using the solar cell to store energy in the rechargeable battery. Accordingly, the present invention can selectively charge overall, partial or single rechargeable battery based on the power production of the solar cell and the capacity of the rechargeable battery to enhance a charging efficiency and reduce a charging time.

20 Claims, 3 Drawing Sheets

CLASSIFIED SOLAR CHARGING METHOD

BACKGROUND OF THE INVENTION

1. Field of the Invention

The present invention is related to a solar charging method, and more particularly to a classified solar charging method selecting an adequate charging current in accordance with a power production of a solar cell and a power storage capacity of a rechargeable battery to more efficiently perform charging.

2. Description of the Related Art

Nowadays, in answer to urgent appeals for energy saving and carbon reduction, exploring renewable energy has become essential. Among all renewable energy resources, such as wind, wave, tidal and the like, development associated with solar energy is prioritized. However, solar energy conversion has drawbacks of low energy conversion efficiency, dependency of sunshine illumination intensity upon converting solar energy into electricity using solar cell. To improve, a counter-measure for tracking of illumination angle of sunshine is addressed to constantly orient solar cell in a direction having maximum sunshine illumination intensity and generate maximal power.

In addition to higher system cost, such maximum power tracking method must be carried out at a correct location. When sunshine illumination intensity is weak, conventional solar energy conversion systems fail to make power storage more efficient. This is because conventional solar charging systems charge entire rechargeable battery pack when using a solar cell to convert solar energy into electricity and charge the entire rechargeable battery pack, resulting in ineffective power allocation and lengthy charging cycle. If the rechargeable batteries in the rechargeable battery pack have inconsistently stored power levels, the charging efficiency is low for failing to charge the rechargeable batteries with an appropriate charging current.

SUMMARY OF THE INVENTION

An objective of the present invention is to provide a classified solar charging method selecting an adequate charging current in accordance with a power production of a solar cell and a power storage capacity of a rechargeable battery to more efficiently perform charging.

To achieve the foregoing objective, the classified solar charging method using a solar cell to charge multiple rechargeable batteries, comprises steps of:

a variable-defining step defining four magnitude classes for each of three variables associated with a power production of the solar cell, an capacity of each rechargeable battery and a charging current to the rechargeable battery, the four magnitude classes of the power production of the solar cell defined as strong, moderate, weak and very weak;

a charging rule establishing step setting up multiple charging modes, each of which determines a value of the charging current in accordance with the corresponding magnitude class for the power production of the solar cell and the corresponding magnitude class for the capacity of each rechargeable battery;

detecting present power production of the solar cell to determine one of the magnitude classes of the power production, wherein when the magnitude class is determined to be strong, the solar cell charges all rechargeable batteries;

when the magnitude class is determined to be moderate, the solar cell charges the rechargeable batteries not having a highest capacity;

when the magnitude class is determined to be weak, the solar cell charges the rechargeable batteries having a lowest capacity;

when the magnitude class is determined to be very weak, the solar cell charges all the rechargeable batteries with the AC mains.

The classified solar charging method preliminarily defines a plurality of charging currents in accordance with a combination selected from multiple magnitude classes of power production of the solar cell and multiple magnitude classes of capacity of each rechargeable battery in a rechargeable battery pack, so as to efficiently complete charging all rechargeable batteries with the power production of the solar cell in a shortest period of time.

DETAILED DESCRIPTION OF THE INVENTION

Figure 1:
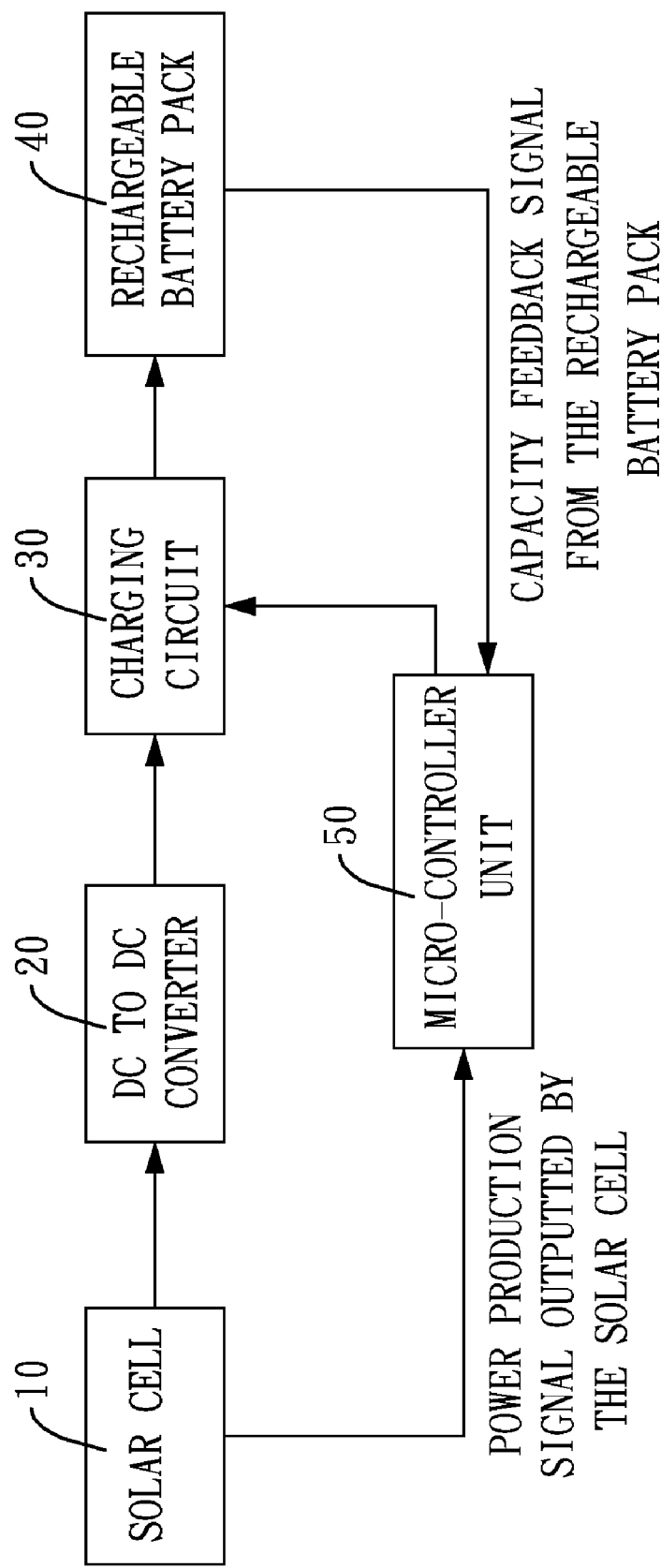
FIG. 1 is a block diagram of a solar charging system executing a classified solar charging method in accordance with the present invention.

With reference to FIG. 1, a classified solar charging method in accordance with the present invention is applied to a solar charging system. The solar charging system has a solar cell (10), a DC to DC converter (20), a charging circuit (30), a rechargeable battery pack (40) and a micro-controller unit (50). The solar cell (10) serves to convert received solar energy into DC voltage. The DC to DC converter (20) receives the converted DC voltage outputted by the solar cell (10) to boost or reduce voltage level of the converted DC voltage and stabilize it at a preset voltage value. The charging circuit (30) receives the stable voltage outputted from the DC to DC converter (20), and prevents the system in a charging or discharging process from being excessively charged or discharged. The rechargeable battery pack (40) is connected with the charging circuit (30) to perform charging. The rechargeable battery pack may be composed of a plurality of rechargeable batteries and the rechargeable battery may be a lithium battery. The micro-controller (50) detects a voltage signal of each of the aforementioned elements, including the DC voltage converted by the solar cell (10) and the stored power capacity of each rechargeable battery in the rechargeable battery pack (40). After acquiring the required voltage signals, the micro-controller unit (50) controls the charging circuit (30) to perform a charging mode. The micro-controller unit (50) also monitors a temperature of the rechargeable battery, and stops the charging task of the charging circuit (30) when the temperature is high.

Figure 2A:
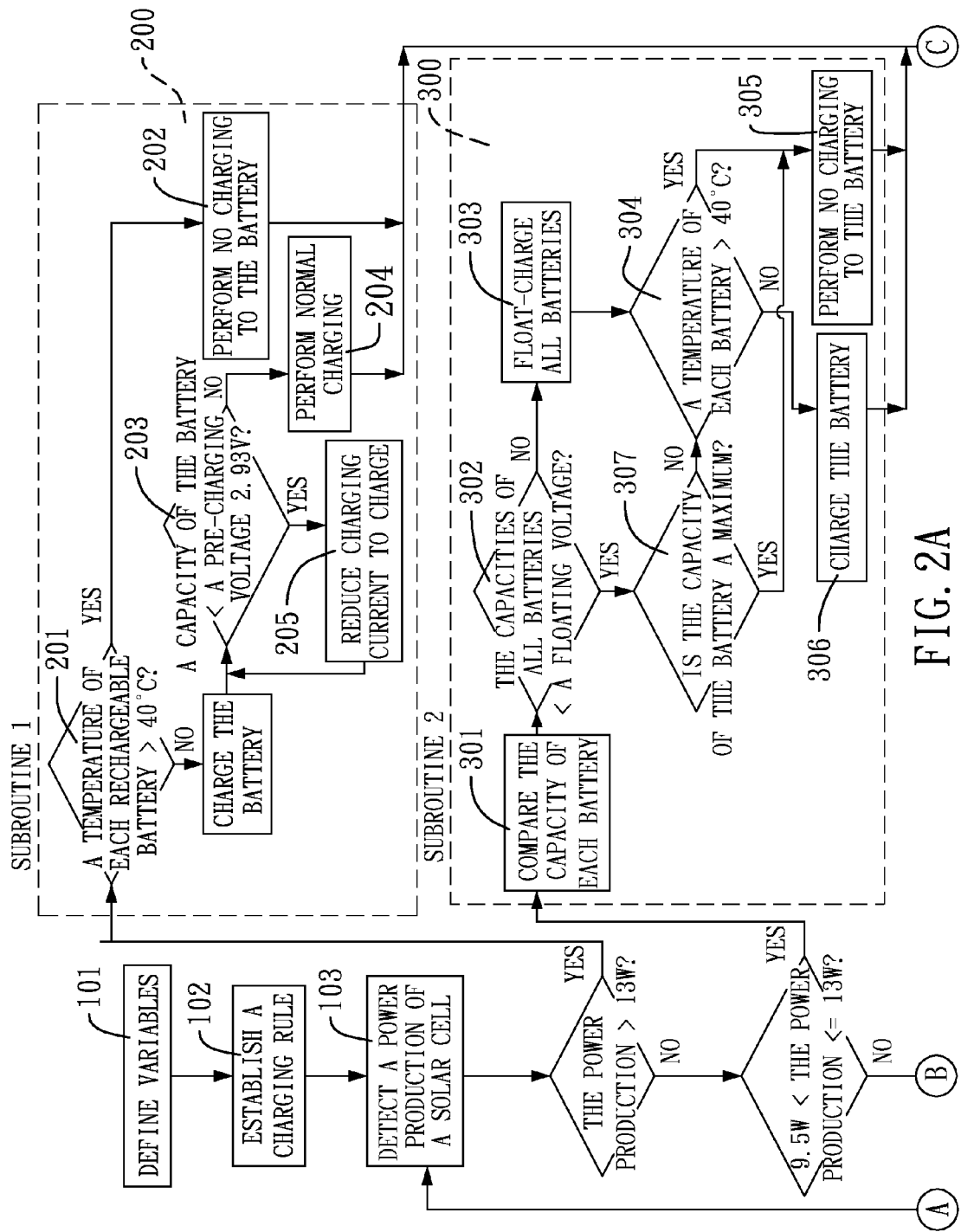
FIG. 2A is one part of a flow diagram of the classified solar charging method in accordance with the present invention.
Figure 2B:
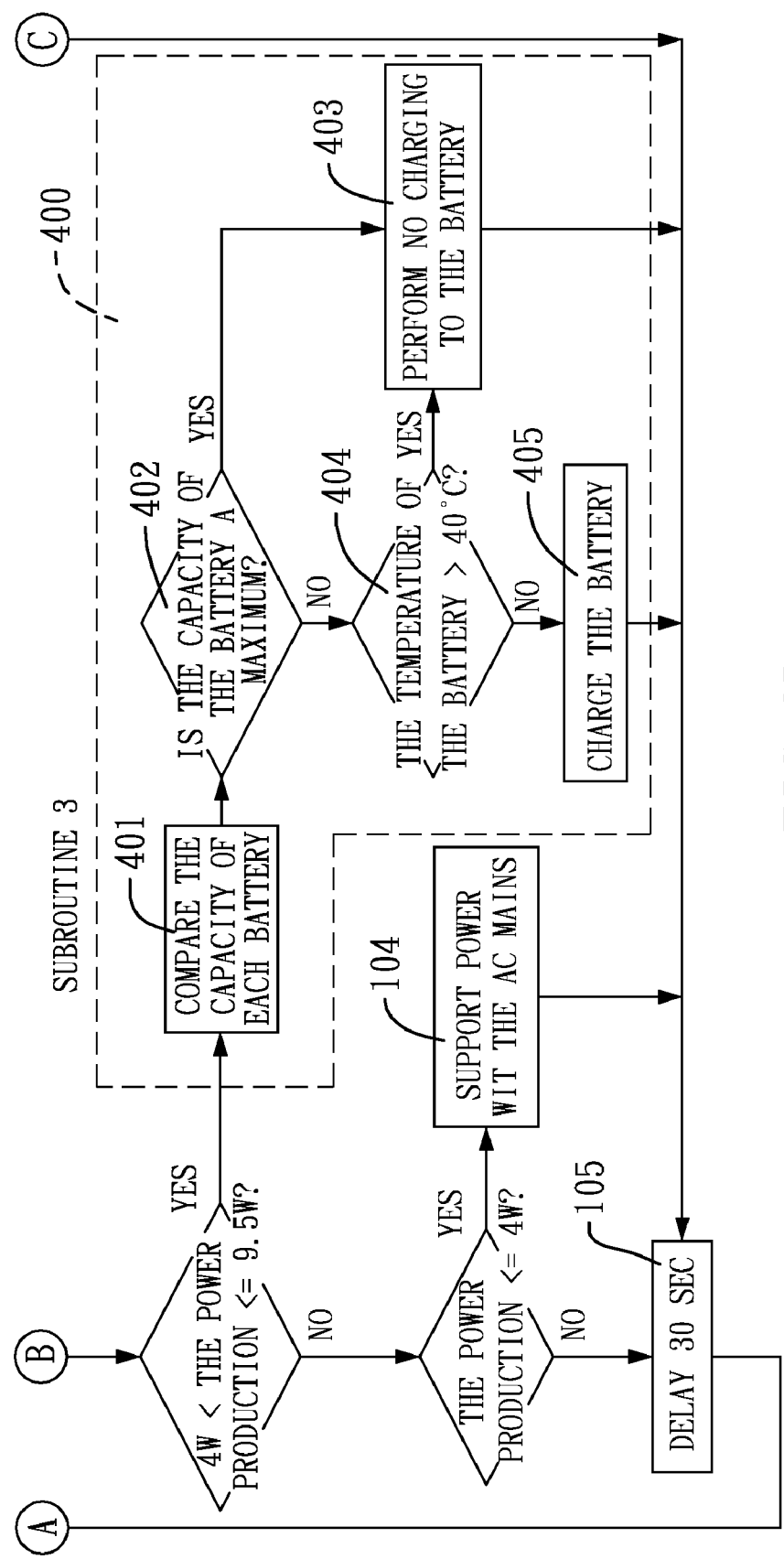
FIG. 2B is the rest of the flow diagram of the classified solar charging method in accordance with the present invention.

With reference to FIGS. 2A and 2B, a classified charging method in accordance with the present invention, which is performed by a solar charging system having a solar cell and multiple rechargeable batteries, has the following steps of:

defining variables (101); this step defines different magnitude classes as follows in accordance with a power production (W) of the solar cell (10), a capacity (AH) of the rechargeable battery, and a charging current (I) to the rechargeable battery:

{ZE, PS, PM, PL} defined as {very weak, weak, moderate, strong} associated with the status of the power production (W) generated by the solar cell (10);

{ZE, PS, PM, PL} defined as {empty, low, moderate, full} associated with the status of the capacity (AH) of the rechargeable battery;

{ZE, PS, PM, PL} defined as {zero, small, medium, large} associated with the status of the charging current (I);

establishing a charging rule (102); this step determines to charge the solar cell (10) with a charging current in accordance with the power production of the solar cell (10) and capacity (AH) of the rechargeable battery; the relationship among the (W), (AH) and (I) is described below:

(1) If the capacity (AH) of the rechargeable battery is PS and the power production (W) of the solar cell is ZE, the charging current (I) is PL;

(2) If the capacity (AH) of the rechargeable battery is PS and the power production (W) of the solar cell is PS, the charging current (I) is PL;

(3) If the capacity (AH) of the rechargeable battery is PS and the power production (W) of the solar cell is PM, the charging current (I) is PM;

(4) If the capacity (AH) of the rechargeable battery is PS and the power production (W) of the solar cell is PL, the charging current (I) is PS;

(5) If the capacity (AH) of the rechargeable battery is PM and the power production (W) of the solar cell is ZE, the charging current (I) is PM;

(6) If the capacity (AH) of the rechargeable battery is PM and the power production (W) of the solar cell is PS, the charging current (I) is PM;

(7) If the capacity (AH) of the rechargeable battery is PM and the power production (W) of the solar cell is PM, the charging current (I) is PM;

(8) If the capacity (AH) of the rechargeable battery is PM and the power production (W) of the solar cell is PL, the charging current (I) is PS;

(9) If the capacity (AH) of the rechargeable battery is PL and the power production (W) of the solar cell is ZE, the charging current (I) is PS;

(10) If the capacity (AH) of the rechargeable battery is PL and the power production (W) of the solar cell is PS, the charging current (I) is PS;

(11) If the capacity (AH) of the rechargeable battery is PL and the power production (W) of the solar cell is PM, the charging current (I) is ZE; and

(12) If the capacity (AH) of the rechargeable battery is PS and the power production (W) of the solar cell is ZE, the charging current (I) is PL;

detecting the power production (W) of the solar cell (103); in the present embodiment, 4 W, 9.5 W and 13 W are used as sub-points to divide the power production (W) of the solar cell into four magnitude classes; once the power production of the solar cell is detected, the pertinent magnitude class of the power production (W) of the solar cell can then be determined;

if the power production of the solar cell is greater than 13 W, the status of the power production being "strong" or PL, executing a first subroutine (200), which first detects if a temperature of each rechargeable battery is greater than the first threshold (e.g. 40° C.) (201), performs no charging to the rechargeable battery having the temperature greater than the first threshold (202), further determines if the capacity (AH) of the rechargeable battery is lower than a pre-charging voltage (e.g. 2.93V) before performing charging to the rechargeable battery having a temperature lower than the first threshold and possibly charged (203), performs normal charging if the capacity (AH) of the rechargeable battery is not lower than the pre-charging voltage (204), lower the charging current to perform charging if the capacity (AH) of the rechargeable battery is lower than the pre-charging voltage (205); accordingly, when the capacity of the rechargeable battery is very small, large charging current possibly burning down the rechargeable battery is avoided to enter the rechargeable battery in the initial stage;

if the power production of the solar cell is between 9.5 W and 13 W, the status of the power production being "moderate" or PM, executing a second subroutine (300), which first compares the capacity of each rechargeable battery (301), determines if the capacities of all the rechargeable batteries are less than a floating voltage (e.g. 4.1V) (302), if all are not less than the floating voltage (i.e. the capacities of part of the rechargeable batteries are more than the floating voltage while the capacities of the rest of the rechargeable batteries are less than the floating voltage), float-charges all the rechargeable batteries (303), further determines if the temperature of each rechargeable battery is higher than a threshold value (304), if the temperature is higher than the threshold value, performs no charging to the rechargeable battery (305), if the temperature is lower than the threshold value, performs charging to the rechargeable battery (306), if the capacities of all the rechargeable batteries are determined to be lower than the floating voltage, further determines if the capacity of each of the rechargeable battery is a maximum (307), performs no charging to the rechargeable battery with the highest capacity (305), and performs charging to the rest of rechargeable batteries (306);

if the power production is between 4 W to 9.5 W, the status of the generated power being "weak" of PL, execute a third subroutine (400), which first compare the capacity of each rechargeable battery (401), determines if the rechargeable battery has the capacity lower than the floating voltage but not the least (402), if the determination result is positive or indicates that the rechargeable battery does not have the least capacity or is greater than the floating voltage, performs no charging to the rechargeable battery (403), if the determination result is negative or indicates that the rechargeable battery has the least capacity or is lower than the floating voltage, then further determines if the temperature of the rechargeable battery is higher than the threshold value (404), if the temperature of the rechargeable battery is higher than the threshold value, performs no charging to the rechargeable battery (403), if the temperature of the rechargeable battery is not higher than the threshold value, performs no charging to the rechargeable battery (405);

if the power production of the solar cell is lower than 4 W, the status of the power production being very weak or ZE, switching to the AC mains to supply power (104), instead of the solar cell supplying the charging energy;

after performing charging or no charging, delaying a period (105); the period may be 30 seconds; after delaying the period (105), further detecting the power production of the solar cell (103) to resume the foregoing determination processes.

Given different magnitude classes for the power production of the solar cell and the capacity of the rechargeable battery, the present invention defines appropriate charging currents by combining the magnitude classes of the power production of the solar cell and the capacity of the rechargeable battery, and further monitors the temperature of the rechargeable battery upon charging. If the temperature is higher than a threshold value, the present invention performs no charging to the rechargeable battery so as not to incur accident upon charging. Accordingly, based on the power production of the solar cell, the present invention performs efficient charging process to the rechargeable batteries and completes the charging process to the rechargeable batteries inside a system within a shortest time.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A classified solar charging method using a solar cell to charge multiple rechargeable batteries, comprising steps of:
   a variable-defining step defining four magnitude classes for each of three variables associated with a power production of the solar cell, a capacity of each rechargeable battery and a charging current of the solar cell, the four magnitude classes of the power production of the solar cell defined as strong, moderate, weak and very weak;
   a charging rule establishing step setting up multiple charging modes, each of which determines a value of the charging current in accordance with the corresponding magnitude class for the power production of the solar cell and the corresponding magnitude class for the capacity of each rechargeable battery;
   detecting the present power production of the solar cell to determine one of the magnitude classes of the power production, wherein
   when the magnitude class is determined to be strong, the solar cell charges all rechargeable batteries;
   when the magnitude class is determined to be moderate, the solar cell charges the rechargeable batteries not having a highest capacity;
   when the magnitude class is determined to be weak, the solar cell charges the rechargeable batteries having a lowest capacity;
   when the magnitude class is determined to be very weak, charge all the rechargeable batteries with the AC mains.

2. The classified solar charging method as claimed in claim 1, wherein
   the step of detecting the present power production of the solar cell further has an act of detecting present capacity of each of the rechargeable batteries to determine one of the magnitude classes of the capacity of each of the rechargeable batteries;
   the four magnitude classes of the capacity of the rechargeable batteries are full, moderate, low and empty;
   the four magnitude classes of the charging current are large, medium, small and zero; and
   the charging rule establishing step sets up the following charging modes:
   the value of the charging current is determined according to the large magnitude class of the charging current if the magnitude class of the rechargeable battery is low and the power production of the solar cell is very weak; the value of the charging current is determined according to the large magnitude class of the charging if the magnitude class of the rechargeable battery is low and power production of the solar cell is weak; the value of the charging current is determined according to the medium magnitude class of the charging current if the magnitude class of the rechargeable battery is low and the power production of the solar cell is moderate; the value of the charging current is determined according to the small magnitude class of the charging current if the magnitude class of the rechargeable battery is low and the power production of the solar cell is strong; the value of the charging current is determined according to the medium magnitude class of the charging current if the magnitude class of the rechargeable battery is moderate and the power production of the solar cell is very weak; the value of the charging current is determined according to the medium magnitude class of the charging current if the magnitude class of the rechargeable battery is moderate and the power production of the solar cell is weak; the value of the charging current is determined according to the medium magnitude class of the charging current if the magnitude class of the rechargeable battery is moderate and the power production of the solar cell is moderate; the value of the charging current is determined according to the small magnitude class of the charging current if the magnitude class of the rechargeable battery is moderate and the power production of the solar cell is strong; the value of the charging current is determined according to the small magnitude class of the charging current if the magnitude class of the rechargeable battery is full and the power production of the solar cell is very weak; the value of the charging current is determined according to the small magnitude class of the charging current if the magnitude class of the rechargeable battery is full and the power production of the solar cell is weak; the value of the charging current is determined according to the zero magnitude class of the charging current if the magnitude class of the rechargeable battery is full and the power production of the solar cell is moderate; and the value of the charging current is determined according to the zero magnitude class of the charging current if the magnitude class of the rechargeable battery is full and the power production of the solar cell is strong.

3. The classified solar charging method as claimed in claim 2, further executing the following steps when the magnitude class of the power production of the solar cell is strong:
   respectively detecting if a temperature of each rechargeable battery is greater than a threshold value, and performing no charging to the rechargeable battery if the temperature of the rechargeable battery is greater than the threshold value; and
   further determining if the capacity of the rechargeable battery is lower than a pre-charging voltage if the temperature of the rechargeable battery is lower than the threshold value, performing charging to the rechargeable battery if negative, and reducing the charging current to perform charging if positive.

4. The classified solar charging method as claimed in claim 2, further executing the following steps when the magnitude class of the power production of the solar cell is moderate:
   comparing the capacity of each rechargeable battery with a floating voltage to determine if the capacity of each rechargeable battery is less than the floating voltage;
   if not all the rechargeable batteries are less than the floating voltage, float-charging all the rechargeable batteries, further determining if the temperature of each rechargeable battery is higher than the threshold value, performing no charging to the rechargeable battery if positive, and performing charging to the rechargeable battery if negative; and if the capacities of all the rechargeable batteries are lower than the floating voltage, further determining if the capacity of each rechargeable battery is the highest, performing no charging to the rechargeable batteries having the highest capacity, and performing charging to the rechargeable batteries not having the highest capacity.

5. The classified solar charging method as claimed in claim 3, further comprising the following steps when the power production of the solar cell is moderate:

comparing the capacity of each rechargeable battery with a floating voltage to determine if the capacity of each rechargeable battery is less than the floating voltage;

if not all the rechargeable batteries are less than the floating voltage, float-charging all the rechargeable batteries, further determining if the temperature of each rechargeable battery is higher than the threshold value, performing no charging to the rechargeable battery if positive, and performing charging to the rechargeable battery if negative; and if the capacities of all the rechargeable batteries are lower than the floating voltage, further determining if the capacity of each rechargeable battery is the highest, performing no charging to the rechargeable batteries having the highest capacity, and performing charging to the rechargeable batteries not having the highest capacity.

6. The classified solar charging method as claimed in claim 2, further comprising the following steps when the power production of the solar cell is weak:

comparing the capacity of each rechargeable battery with a floating voltage and determining if the capacity of each rechargeable battery is less than the floating voltage and not the least;

performing no charging to the rechargeable battery if positive; and detecting a temperature of the rechargeable battery and determining if the temperature is above a threshold value, performing no charging to the rechargeable battery if positive, and performing charging to the rechargeable battery if negative.

7. The classified solar charging method as claimed in claim 3, further comprising the following steps when the power production of the solar cell is weak:

comparing the capacity of each rechargeable battery with a floating voltage and determining if the capacity of each rechargeable battery is less than the floating voltage and not the least;

performing no charging to the rechargeable battery if positive; and detecting a temperature of the rechargeable battery and determining if the temperature is above a threshold value, performing no charging to the rechargeable battery if positive, and performing charging to the rechargeable battery if negative.

8. The classified solar charging method as claimed in claim 4, further comprising the following steps when the power production of the solar cell is weak:

comparing the capacity of each rechargeable battery with a floating voltage and determining if the capacity of each rechargeable battery is less than the floating voltage and not the least;

performing no charging to the rechargeable battery if positive; and detecting a temperature of the rechargeable battery and determining if the temperature is above a threshold value, performing no charging to the rechargeable battery if positive, and performing charging to the rechargeable battery if negative.

9. The classified solar charging method as claimed in claim 5, further comprising the following steps when the power production of the solar cell is weak:

comparing the capacity of each rechargeable battery with a floating voltage and determining if the capacity of each rechargeable battery is less than the floating voltage and not the least;

performing no charging to the rechargeable battery if positive; and detecting a temperature of the rechargeable battery and determining if the temperature is above a threshold value, performing no charging to the rechargeable battery if positive, and performing charging to the rechargeable battery if negative.

10. The classified solar charging method as claimed in claim 1, wherein the rechargeable battery is a lithium battery.

11. The classified solar charging method as claimed in claim 2, wherein the rechargeable battery is a lithium battery.

12. The classified solar charging method as claimed in claim 3, wherein the rechargeable battery is a lithium battery.

13. The classified solar charging method as claimed in claim 9, wherein the rechargeable battery is a lithium battery.

14. The classified solar charging method as claimed in claim 3, wherein the threshold value is 40° C. when determining if the temperature of the rechargeable battery is below the threshold value.

15. The classified solar charging method as claimed in claim 4, wherein the threshold value is 40° C. when determining if the temperature of the rechargeable battery is below the threshold value.

16. The classified solar charging method as claimed in claim 5, wherein the threshold value is 40° C. when determining if the temperature of the rechargeable battery is below the threshold value.

17. The classified solar charging method as claimed in claim 6, wherein the threshold value is 40° C. when determining if the temperature of the rechargeable battery is below the threshold value.

18. The classified solar charging method as claimed in claim 7, wherein the threshold value is 40° C. when determining if the temperature of the rechargeable battery is below the threshold value.

19. The classified solar charging method as claimed in claim 8, wherein the threshold value is 40° C. when determining if the temperature of the rechargeable battery is below the threshold value.

20. The classified solar charging method as claimed in claim 9, wherein the threshold value is 40° C. when determining if the temperature of the rechargeable battery is below the threshold value.

* * * * *